(12) United States Patent
Cho et al.

(10) Patent No.: US 12,519,641 B2
(45) Date of Patent: Jan. 6, 2026

(54) COMPOUNDED INTRINSIC IDENTITIES FOR INFORMATION HANDLING SYSTEMS (IHSs)

(71) Applicant: Dell Products, L.P., Round Rock, TX (US)

(72) Inventors: Eugene David Cho, Austin, TX (US); Milton Olavo Decarvalho Taveira, Round Rock, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 243 days.

(21) Appl. No.: 18/184,186

(22) Filed: Mar. 15, 2023

(65) Prior Publication Data
US 2024/0313967 A1     Sep. 19, 2024

(51) Int. Cl.
*H04L 9/32*     (2006.01)
*H04L 9/08*     (2006.01)

(52) U.S. Cl.
CPC .............. *H04L 9/32* (2013.01); *H04L 9/0825* (2013.01); *H04L 9/0838* (2013.01)

(58) Field of Classification Search
None
See application file for complete search history.

(56) References Cited

U.S. PATENT DOCUMENTS

| 8,516,269 | B1 * | 8/2013 | Hamlet | G06F 21/445 |
| | | | | 713/180 |
| 2022/0070056 | A1 * | 3/2022 | Narayanan | H04L 67/34 |
| 2023/0146861 | A1 * | 5/2023 | Bouillon | H03K 19/0813 |
| | | | | 716/104 |
| 2023/0283487 | A1 * | 9/2023 | Angelo | H04L 9/3278 |
| | | | | 713/168 |

FOREIGN PATENT DOCUMENTS

| CN | 215117523 U | * | 12/2021 | |
| WO | WO-2019155693 A1 | * | 8/2019 | ............ G06F 21/556 |
| WO | WO-2021076118 A1 | * | 4/2021 | ............ H04L 63/06 |

* cited by examiner

*Primary Examiner* — Benjamin E Lanier
(74) *Attorney, Agent, or Firm* — Fogarty LLP (57) ABSTRACT

Systems and methods for producing, using, and managing Compounded Intrinsic Identities (CIIS) for Information Handling Systems (IHSs) are described. In an illustrative, non-limiting embodiment, an IHS may include a processor and a memory coupled to the processor, the memory having program instructions stored thereon that, upon execution by the processor, cause the IHS to: receive a first indication of a first variable associated with a unique physical or electrical aspect of a first IHS component, receive a second indication of a second variable associated with a unique physical or electrical aspect of a second IHS component, and produce at least one identity seed associated with the IHS based, at least in part, upon a combination of the first and second indications.

20 Claims, 3 Drawing Sheets

COMPOUNDED INTRINSIC IDENTITIES FOR INFORMATION HANDLING SYSTEMS (IHSs)

FIELD

This disclosure relates generally to Information Handling Systems (IHSs), and more specifically, to systems and methods for producing, using, and managing Compounded Intrinsic Identities (CIIS) for IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

A Physical Unclonable Function (PUF) is an object that provides a "digital fingerprint" or "seed" that can serve as a unique identifier for an individual semiconductor device (e.g., a processor). PUF seeds are created based on unique physical variations that occur naturally during the manufacturing of a device. Because each PUF seed is deterministically generated at each power-up of its device, that device does not ordinarily have to store information about its own identity, which could otherwise be potentially stolen by a wrongdoer.

The inventors hereof have recognized, however, that in the case of an IHS assembled with a multitude of semiconductor devices, selecting one semiconductor device to be representative of the entire IHS's identity can create a host of security issues. For example, if the selected device were removed from a first IHS and placed in a second IHS, the second IHS would then carry the identity of the first IHS.

To address these, and other concerns, the inventors hereof have developed the various systems and methods for producing, using, and managing Compounded Intrinsic Identities (CIIS) for IHSs, as described herein.

SUMMARY

Systems and methods for producing, using, and managing Compounded Intrinsic Identities (CIIS) for Information Handling Systems (IHSs) are described. In an illustrative, non-limiting embodiment, an IHS may include a processor and a memory coupled to the processor, the memory having program instructions stored thereon that, upon execution by the processor, cause the IHS to: receive a first indication of a first variable associated with a unique physical or electrical aspect of a first IHS component, receive a second indication of a second variable associated with a unique physical or electrical aspect of a second IHS component, and produce at least one identity seed associated with the IHS based, at least in part, upon a combination of the first and second indications.

For example, the processor may include an Embedded Controller (EC) or a Baseboard Management Controller (BMC). At least one of the first or second IHS components may be selected from the group consisting of: the processor, a Central Processing Unit (CPU), a Graphics Processing Unit (GPU), a Trusted Platform Module (TPM), a Systems-On-Chip (SoC), and a voltage regulator. Additionally, or alternatively, at least one of the first or second IHS components may be selected from the group consisting of: a pluggable Peripheral Component Interconnect Express (PCIe) card, a Power Supply Unit (PSU), and a pluggable Datacenter-ready Secure Control Module (DC-SCM).

At least one of the first or second variables may include an immutable variable, such as a voltage calibration value, etc. Additionally, or alternatively, at least one of the first or second variables may include a mutable variable, such as an undervoltage interrupt register value, a voltage rail level, a switch status, an analog-to-digital calibration value, a digital-to-analog calibration value, or link training data.

In some cases, the program instructions, upon execution, may cause the IHS to produce the identity seed, at least in part, using at least one one-way mathematical operation and at least one Key Derivation Function (KDF). Additionally, or alternatively, the program instructions, upon execution, may cause the IHS to create a cryptographic key pair usable to uniquely identify the IHS based, at least in part, upon the identity seed. The cryptographic key pair may be created based upon a combination of indications of exclusively immutable variables.

The program instructions, upon execution, may cause the IHS to provide a public key portion of the cryptographic key pair to a service configured to verify or attest an identify of the IHS. The cryptographic key pair may be created based upon a combination of indications of mutable and immutable variables.

The program instructions, upon execution, may cause the IHS to provide a public key portion of the cryptographic key pair to a service configured to notify a user or Information Technology Decision Maker (ITDM) of a hardware drift with respect to the IHS.

In another illustrative, non-limiting embodiment, a memory device may have program instructions stored thereon that, upon execution by an EC or BMC of an IHS, cause the EC or BMC to: receive indications of variables associated with unique physical or electrical aspects of each of a plurality of IHS components, produce at least one identity seed for the IHS based, at least in part, upon the indications, and create a cryptographic key pair usable to uniquely identify the IHS based, at least in part, upon the identity seed.

The identity seed may be created based upon indications of exclusively immutable variables associated with the unique physical or electrical aspects, and the program instructions, upon execution, may cause the IHS to provide a public key portion of the cryptographic key pair to a service configured to: verify or attest an identity of the IHS, or detect tampering with the IHS.

Alternatively, the identity seed may be created based upon indications of mutable and immutable variables associated with the unique physical or electrical aspects, and the program instructions, upon execution, may cause the IHS to provide a public key portion of the cryptographic key pair to a service configured to notify a user or ITDM of a hardware drift with respect to the first IHS.

In another illustrative, non-limiting embodiment, a method may include: receiving, from a first IHS at a second IHS configured to verify an identify of the first IHS, a public key portion of a cryptographic key pair created, at least in part, based upon an identity seed produced by the first IHS, where the identity seed is produced, at least in part, based upon unique physical or electrical aspects of a plurality of hardware components of the first IHS, encrypting original data into encrypted data using the public key, sending the encrypted data to the first IHS, receiving decrypted data from the first IHS, and determining whether the decrypted data matches the original data.

In some cases, the identity seed may be created based upon indications of exclusively immutable variables associated with the unique physical or electrical aspects, and at least in part in response to the decrypted data matching the original data, the second IHS may be configured to verify or attest an identity of the first IHS.

Alternatively, the identity seed may be created based upon indications of mutable and immutable variables associated with the unique physical or electrical aspects, and at least in part in response to the decrypted data not matching the original data, the second IHS may be configured to notify a user or ITDM of a hardware drift with respect to the first IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
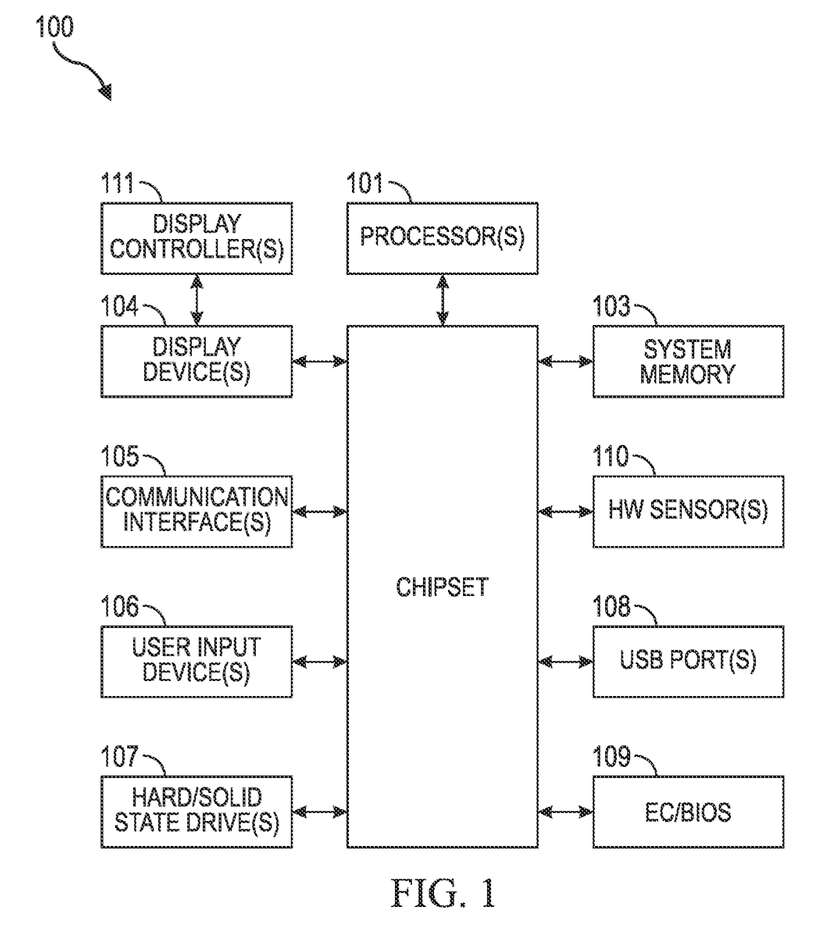
FIG. 1 is a diagram illustrating an example of an Information Handling System (IHS), according to some embodiments.

FIG. 1 is a diagram illustrating an example of an Information Handling System (IHS). As depicted, IHS 100 includes processor(s) or CPUs 101. In various implementations, IHS 100 may be a single-processor system, or a multi-processor system including two or more processors. Processor(s) 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor(s) 101. Chipset 102 may provide processor(s) 101 with access to several resources. In some cases, chipset 102 may utilize a QuickPath Interconnect (QPI) bus to communicate with processor(s) 101.

Chipset 102 may also be coupled to communication interface(s) 105 to enable communications between IHS 100 and various wired and/or wireless networks, such as Ethernet, WiFi, BT, cellular or mobile networks (e.g., CDMA, TDMA, LTE, etc.), satellite networks, or the like. In some cases, communication interface(s) 105 may be used to communicate with A/V devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc.

Chipset 102 may provide processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor(s) 101, enable a collaboration mode for a touchpad coupled or integrated into IHS 100.

Chipset 102 may also provide access to one or more hard disk(s) and/or solid-state drive(s) 107. In certain embodiments, chipset 102 may also provide access to one or more optical drive(s) or other removable-media drive(s).

In certain embodiments, chipset 102 may also provide access to one or more USB port(s) 108, to which one or more A/V peripheral devices may be coupled (e.g., integrated or external webcams, microphones, speakers, etc.).

Chipset 102 may further provide access to one or more user input device(s) 106, for example, using a super I/O controller or the like. Examples of user input device(s) 106 include, but are not limited to: a keyboard, mouse, touchpad, stylus or active pen, totem, etc. Each of user input device(s)

106 may include a respective controller (e.g., a touchpad may have its own touchpad controller) that interfaces with chipset 102 through a wired or wireless connection (e.g., via communication interface(s) 105).

In certain embodiments, chipset 102 may also provide an interface for communications with one or more hardware (HW) sensor(s) 110. Sensor(s) 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100.

BIOS 109 provides an abstraction layer that allows the OS to interface with certain hardware components that are utilized by IHS 100. Via the hardware abstraction layer provided by BIOS 109, software stored in system memory 103 and executed by processor(s) 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be used to provide various core operations of IHS 100, such as power management and management of certain modes of IHS 100 (e.g., turbo modes, maximum operating clock frequencies of certain components, etc.). For example, EC 109 may implement operations for interfacing with a power adapter in managing power for IHS 100. Such operations may be utilized to determine the power status of IHS 100, such as whether IHS 100 is operating from battery power or is plugged into an AC power source.

Also, EC 109 may implement operations for detecting certain changes to the physical configuration or posture of IHS 100 and managing the modes of a touchpad or other user input device(s) 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

In some cases, EC 109 may be installed as a Trusted Execution Environment (TEE) component configured to calculate hashes or signatures that uniquely identify other components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

Moreover, EC 109 may include a cryptographic engine or module configured to calculate hashes, keys, or signatures, for example, based on one or more seeds (e.g., alphanumeric strings). In operation, the EC 109's cryptographic engine may be configured to receive or generate a seed, and then produce an encryption key pair (i.e., a public key and a matching private key) based upon the seed using one or more One-way Functions (ONFs) and/or Key Derivation Functions (KDFs).

As used herein, the term "ONe-way Function" or "ONF" refers to a mathematical operation that computes an output based upon an input. As an operation, an ONF is difficult (or impossible) to invert to reproduce the original input based upon its output.

The term "Key Derivation Function" or "KDF" refers to a cryptographic algorithm that derives one or more secret keys from a secret value, such as a seed, typically by executing pseudorandom operation(s).

In some embodiments, IHS 100 may not include all the components of FIG. 1. In other embodiments, IHS 100 may include other components in addition to those that are shown in FIG. 1. Furthermore, some components that are represented as separate components may instead be integrated with other components. For example, all or a portion of the operations executed by the illustrated components may instead be provided by components integrated into processor(s) 101 as Systems-On-a-Chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
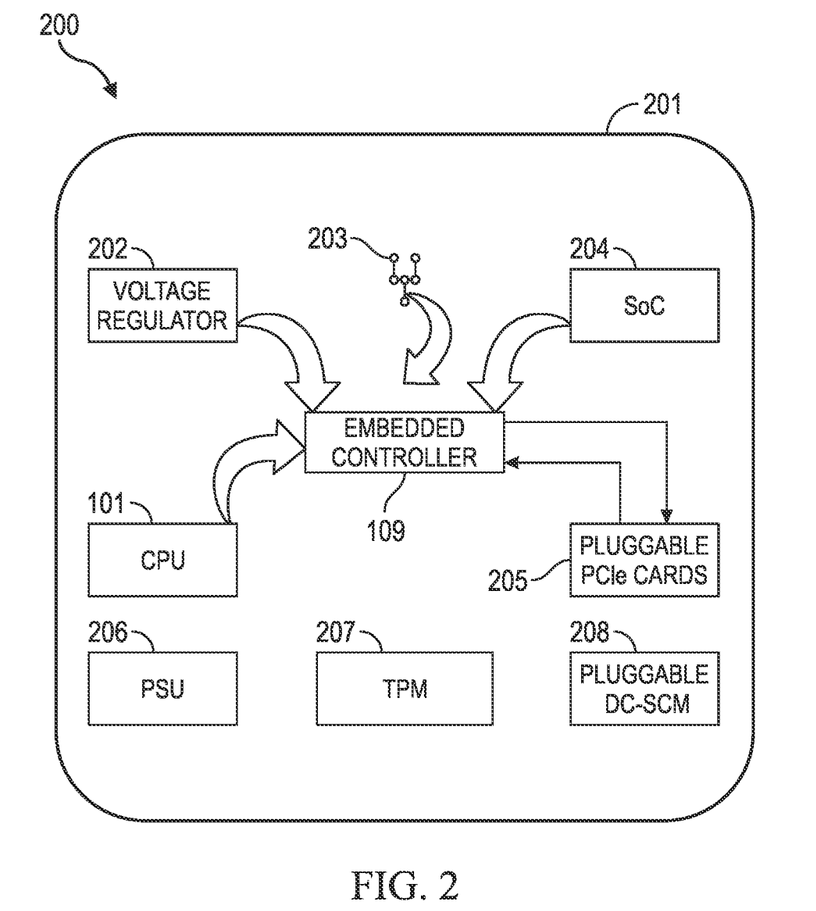
FIG. 2 is a diagram illustrating examples of components usable to produce Compounded Intrinsic Identities (CIIS) for an IHS, according to some embodiments.

FIG. 2 is a diagram illustrating examples of components 200 usable to produce Compounded Intrinsic Identities (CIIS) for IHS 100. In this implementation, EC 109 may be designated as a management controller or sensing lead configured to calculate a CIIS for IHS 100 based upon indications of variables associated with unique physical or electrical aspects of components 200, which typically result from instance-to-instance variations in the manufacturing of such components. (In some cases, CIIS may be a seed that has other seeds as inputs.)

Components 200 may be mounted (e.g., soldered, inserted into a slot or connector, etc.) of Printed Circuit Board Assembly (PCBA) 201 within the chassis of IHS 100 (e.g., a motherboard). As shown, components 200 include CPU 101, voltage regulator 202, grounding straps or switches 203, SoC 204, pluggable PCIe cards 205, Power Supply Unit (PSU) 206, Trusted Platform Module (TPM) 207, and pluggable Datacenter-ready Secure Control Module (DC-SCM) 208. In other implementations, additional, fewer, and/or different IHS components may be used.

In operation, EC 109 may be configured to deterministically harvest unique physical and/or electrical characteristics of one or more of components 200 (e.g., upon booting up of IHS 100), and to use those characteristics to produce an overall fingerprint of IHS 100 in the form of a CIIS seed. The on-boot calculated CIIS seed may be fed into a cryptographic engine, so as not to be vulnerable to exfiltration (e.g., by malicious or compromised software). The cryptographic engine may then use the seed to create a cryptographic key pair comprising a public key portion and a private key portion.

In some cases, the private key may be used to attest or verify the identity of IHS 100. For example, another IHS may encrypt an original alphanumeric string with the public key created by IHS 100 and transmit it to IHS 100. EC 109 within IHS 100 may receive the encrypted string, decrypt it with a corresponding private key, and return the decrypted string to the other IHS.

If the other IHS determines that the decrypted string matches the original string, then the other IHS has in effect verified the authenticity of IHS 100. However, if the other IHS determines that the decrypted string does not match the original string, then the other IHS may perform some sort of remedial action, such as notifying a user or Information Technology Decision Maker (ITDM) that IHS 100 may have been compromised.

With respect to the physical and/or electrical characteristics of components 200 usable by EC 109 to produce a CIIS seed, such characteristics may be classified as immutable or mutable. An immutable characteristic is one that is not expected to change from boot-to-boot, except for the natural decay or micro-degradation of materials used to build the component (e.g., due to interactions, within a component's packaging, between silicon and alpha/cosmic particles). Conversely, a mutable characteristic is one that is expected to change frequently, often at every reading, testing, sensing, or boot-up (e.g., altitude, temperature, humidity, etc.).

For example, immutable variables sensed, tested, or otherwise obtainable by EC 109 from CPU 101 may include unique, per-silicon voltage calibration values, whereas mutable variables may include the states of undervoltage interrupt registers.

Additionally, or alternatively, immutable variables sensed, tested, or otherwise obtainable by EC 109 from voltage regulator 202 may include unique, per-silicon voltage calibration values, whereas mutable variables may include the values of selected voltage rails.

Additionally, or alternatively, immutable variables sensed, tested, or otherwise obtainable by EC 109 from grounding straps or switches 203 may include unique electrical characteristics of grounding straps (e.g., via an Analog-to-Digital Converter or "ADC," General Purpose Input/Output or "GPIO" pin, etc.), whereas mutable variables may include electrical characteristics of switches or transistors (e.g., via GPIO pins, etc.).

Additionally, or alternatively, immutable variables sensed, tested, or otherwise obtainable by EC 109 from SoC 204 may include byproducts of the SoC's Physical Unclonable Function (PUF), One-Time Password (OTP) seeds, unique serial numbers, cryptographic identities, and/or unique, per-silicon voltage calibration values, whereas mutable variables may include ADC values (e.g., battery value, etc.) and/or Digital-to-Analog or "DAC" values.

Additionally, or alternatively, immutable variables sensed, tested, or otherwise obtainable by EC 109 from pluggable PCIe cards 205 may include unique serial numbers, cryptographic identities, and/or unique, per-silicon voltage calibration values, whereas mutable variables may include PCIe training data (e.g., calibration, sweep, strength, etc.).

Figure 3:
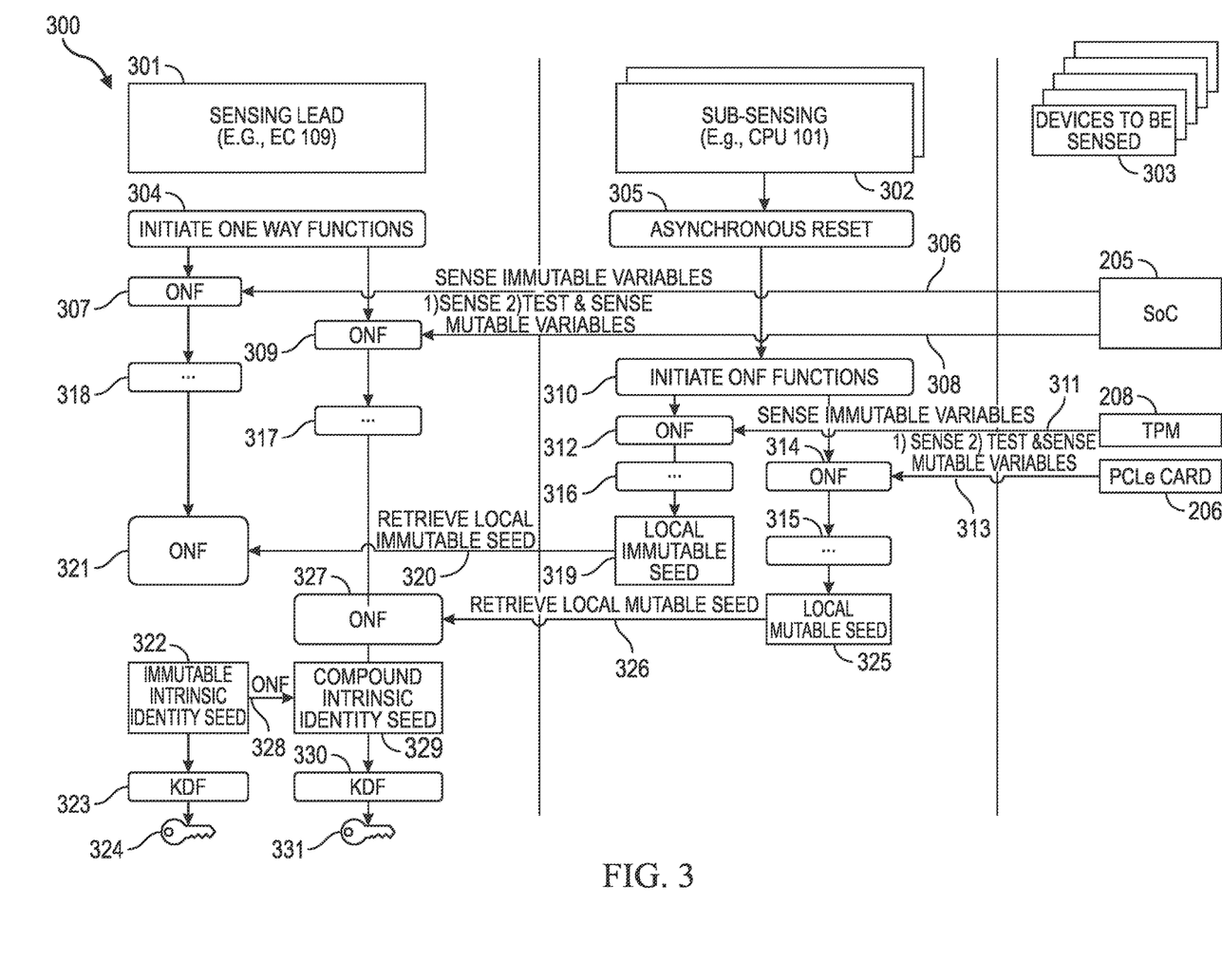
FIG. 3 is a flowchart illustrating an example of a method for producing Compounded Intrinsic Identities (CIIS) for an IHS, according to some embodiments.

FIG. 3 is a flowchart illustrating an example of method 300 for producing CIIS for an IHS. In this implementation, method 300 may be performed by sensing lead or management controller 301 (e.g., EC 109), sub-sensing device 302 (e.g., CPU 101, a storage controller, etc.), and/or devices to be sensed 300 (e.g., IHS components 200).

At 304, sensing lead 301 initiates its ONFs. For example, an ONF may include a hash function, and the result of each ONF concatenates onto the next ONF as: New Hash=HASH FUNCTION (previous Hash|variable), where "variable" may be defined as Unique Identifying String or UID+Value+padding (e.g., "PCI Training Voltage"+"128"+padding).

At 305, sub-sensing device 302 may perform an asynchronous reset. Then, at 306, sensing lead 301 senses and/or receives an indication of immutable variables from SoC 205 and applies ONF 307 to it. At 308, sensing lead 301 senses and/or tests and senses an indication of mutable variables from SoC 205 and applies ONF 309 to it.

At 310, sub-sensing device 302 initiates its ONFs. At 311, sub-sensing device 302 senses and/or receives an indication of immutable variables from TPM 208 and performs ONF 312 upon it. At 313, sub-sensing device 302 senses and/or tests and senses an indication of mutable variables from PCIe card 206 and applies ONF 314 to it.

At 318, 317, 316, and 315, additional operations may be performed upon the results of ONFs 307, 309, 312, and 314, respectively. At 319, sub-sensing device 302 may produce a local immutable seed, and at 325 sub-sensing device may produce a local mutable seed.

At 320, sensing lead 301 may receive the local immutable seed from sub-sensing device 302 and it may apply ONF 321 to it to produce, at 322, an Immutable Intrinsic Identify seed (IIIS). Sensing lead 301 may apply KDF 323 to the IIIS to create a first cryptographic key pair 324. In some cases, a KDF 323 may generate an Immutable Intrinsic Identity Asymmetric Key, derived from an IIIS seed and usable for the remote attestation of unexpected changes.

At 326, sensing lead 301 may receive the local mutable seed from sub-sensing device 302 and it may apply ONF 327 to it. The outputs of ONFs 327 and 328 may be combined at 329 to generate a CIIS. Sensing lead 301 may apply KDF 330 to the CIIS to create a second cryptographic key pair 331. KDF 330 may generate a compounded Intrinsic Identity Asymmetric Key, derived from an CIIS seed and usable for the remote attestation of both unexpected and expected changes.

In some cases, sensing device 301 may log changes to the IIIS and/or CIIS over time (e.g., <value> at <time>) for a multitude of purposes. For example, in some embodiments, the IIIS and/or the first cryptographic key pair may be usable to verify or attest the identity of IHS 100. Conversely, the CIIS and/or the second cryptographic key pair may be usable to detect potential issues with IHS 100 (e.g., tampering, use in unauthorized locations, etc.), for example, based upon a frequency and/or degree of changes.

In some cases, the CIIS and/or the second cryptographic key pair may be used as mutable hardware drift attestation key to provide cryptographic attestation of changes in hardware, with such changes chaining back to a verifiable Certificate Authority (AC) or anchor. The CIIS and/or the second cryptographic key pair may also be employed in security threat analysis, such that changes may be used to trigger user or ITDM notifications, auditing, security scans, etc. In addition, the CIIS and/or the second cryptographic key pair may be used to perform predictive component/IHS failure analysis by training Artificial Intelligence/Machine Learning (AI/ML) models (e.g., an increasing frequency of change may be indicative of future failures before those failures happen).

As such, systems and methods described herein may provide identity seeds and/or keys that can live the life of IHS 100 (but are not necessarily expected to). The holistic, singular IHS seeds and identity keys produced via these systems and methods may incorporate the intrinsic physical and electrical uniqueness of components soldered on an IHS's motherboard, as well as pluggable components (e.g., card slots, sockets, etc.).

To implement various operations described herein, computer program code (i.e., program instructions for carrying out these operations) may be written in any combination of one or more programming languages, including an objectoriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
    a processor; and
    a memory coupled to the processor, the memory configured with program instructions stored thereon that, upon execution by the processor, cause the IHS to perform operations upon IHS boot in response to an asynchronous reset of the processor, wherein the operations comprise:
        receive a first indication that comprises a first variable associated with a unique physical or electrical aspect of a first IHS component;
        permit initialization upon IHS boot of a Peripheral Component Interconnect Express (PCIe) communication link configured in a PCIe bus in the IHS, wherein initialization of the PCIe communication link comprises train the PCIe communication link, and wherein the PCIe bus interconnects a plurality of PCIe peripherals that comprise at least one pluggable PCIe card;
        obtain a PCIe communication link train voltage while the PCIe communication link is trained, via a sense lead electrically connected to a second IHS component that comprises the PCIe bus, wherein a value of the PCIe communication link train voltage is a second indication of a second variable associated with a unique electrical aspect of the second IHS component;
        apply a first one-way function (ONF) to the first variable to produce a first ONF output;
        apply a second ONF to the value of the PCIe communication link train voltage to produce a second ONF output;
        concatenate the second ONF output onto a previous second ONF output, to produce a concatenated second ONF output;
        produce at least one identity seed associated with the IHS based, at least in part, upon a combination of the first ONF output and the concatenated second ONF output;
        log changes to the at least one identity seed as a function of time; and trigger a notification based, at least in part, upon a frequency of logged changes to the at least one identity seed.

2. The IHS of claim 1, wherein the processor comprises an Embedded Controller (EC) or a Baseboard Management Controller (BMC).

3. The IHS of claim 1, wherein the first IHS component is selected from the group consisting of: the processor, a Central Processing Unit (CPU), a Graphics Processing Unit (GPU), a Trusted Platform Module (TPM), a Systems-On-Chip (SoC), and a voltage regulator.

4. The IHS of claim 1, wherein the first IHS component is selected from the group consisting of: a pluggable Peripheral Component Interconnect Express (PCIe) card, a Power Supply Unit (PSU), and a pluggable Datacenter-ready Secure Control Module (DC-SCM).

5. The IHS of claim 1, wherein at least one of the first or second variables further comprises an immutable variable.

6. The IHS of claim 5, wherein the immutable variable comprises a voltage calibration value.

7. The IHS of claim 1, wherein at least one of the first or second variables further comprises a mutable variable.

8. The IHS of claim 7, wherein the at least one of the first or second mutable variables further comprises at least one of: an undervoltage interrupt register value, a voltage rail level, a switch status, an analog-to-digital calibration value, a digital-to-analog calibration value, or one or more PCIe link train data variables selected from the group consisting of calibration, sweep voltage, and strength.

9. The IHS of claim 1, wherein further program instructions, upon execution, cause the IHS to perform further operations comprising produce the at least one identity seed based, at least in part, on the first ONF output, the concatenated second ONF output, and at least one Key Derivation Function (KDF).

10. The IHS of claim 1, wherein further program instructions, upon execution, cause the IHS to perform further operations comprising create a cryptographic key pair usable to uniquely identify the IHS based, at least in part, upon the at least one identity seed.

11. The IHS of claim 10, wherein the cryptographic key pair is created based upon a combination of indications of exclusively immutable variables.

12. The IHS of claim 11, wherein further program instructions, upon execution, cause the IHS to perform further operations comprising provide a public key portion of the cryptographic key pair to a service configured to verify or attest an identify of the IHS.

13. The IHS of claim 10, wherein the cryptographic key pair is created based upon a combination of indications of mutable and immutable variables.

14. The IHS of claim 13, wherein further program instructions, upon execution, cause the IHS to perform further operations comprising provide a public key portion of the cryptographic key pair to a service configured to notify a user or Information Technology Decision Maker (ITDM) of a hardware change with respect to the IHS.

15. A memory device configured with program instructions stored thereon that, upon execution by a processor configured in an Embedded Controller (EC) or Baseboard Management Controller (BMC) of an Information Handling System (IHS), cause the EC or BMC to perform operations upon IHS boot in response to an asynchronous reset of the processor, wherein the operations comprise:

receive a first indication that comprises a first variable associated with a unique physical or electrical aspect of a first IHS component;

permit initialization upon IHS boot of a Peripheral Component Interconnect Express (PCIe) communication link configured in a PCIe bus in the IHS, wherein initialization of the PCIe communication link comprises train the PCIe communication link, and wherein the PCIe bus interconnects a plurality of PCIe peripherals that comprise at least one pluggable PCIe card;

obtain a PCIe communication link train voltage while the PCIe communication link is trained, via a sense lead electrically connected to a second IHS component that comprises the PCIe bus, wherein a value of the PCIe communication link train voltage is a second indication of a second variable associated with a unique electrical aspect of the second IHS component;

apply a first one-way function (ONF) to the first variable to produce a first ONF output;

apply a second ONF to the value of the PCIe communication link train voltage to produce a second ONF output;

concatenate the second ONF output onto a previous second ONF output, to produce a concatenated second ONF output;

produce at least one identity seed associated with the IHS based, at least in part, upon a combination of the first ONF output and the concatenated second ONF output;

create a cryptographic key pair usable to uniquely identify the IHS based, at least in part, upon the at least one identity seed;

log changes to the at least one identity seed as a function of time; and trigger a notification based, at least in part, upon a frequency of logged changes to the at least one identity seed.

16. The memory device of claim 15, wherein the at least one identity seed is produced based upon indications of exclusively immutable variables associated with the unique physical or electrical aspects, and wherein further program instructions, upon execution, further cause the IHS to perform operations that comprise provide a public key portion of the cryptographic key pair to a service configured to: verify or attest an identity of the IHS, or detect tampering with the IHS.

17. The memory device of claim 15, wherein the at least one identity seed is produced based upon indications of mutable and immutable variables associated with the unique physical or electrical aspects, and wherein further program instructions, upon execution, further cause the IHS to provide a public key portion of the cryptographic key pair to a service configured to notify a user or Information Technology Decision Maker (ITDM) of a hardware change with respect to the IHS.

18. A method, comprising:

receiving, by a processor of a first Information Handling System (IHS) upon booting the first IHS, a first variable associated with a unique physical or electrical aspect of a first component of the first IHS;

permitting, by the processor of the first IHS upon booting the first IHS, initializing a Peripheral Component Interconnect Express (PCIe) communication link configured in a PCIe bus in the first IHS, wherein initializing the PCIe communication link comprises training the PCIe communication link, and wherein the PCIe bus interconnects a plurality of PCIe peripherals that comprise at least one pluggable PCIe card;

obtaining, by the processor of the first IHS, a PCIe communication link train voltage while the PCIe communication link is trained, via a sense lead electrically connected to a second component of the first IHS that comprises the PCIe bus, wherein a value of the PCIe communication link train voltage is a second variable associated with a unique electrical aspect of the second component of the first IHS;

applying, by the processor of the first IHS, a first one-way function (ONF) to the first variable to produce a first ONF output;

applying, by the processor of the first IHS, a second ONF to the value of the PCIe communication link train voltage to produce a second ONF output;

concatenating, by the processor of the first IHS, the second ONF output onto a previous second ONF output, to produce a concatenated second ONF output;

producing, by the processor of the first IHS, at least one identity seed for the first IHS based, at least in part, upon the PCIe communication link train voltage;

creating, by the processor of the first IHS, a cryptographic key pair usable to uniquely identify the first IHS based, at least in part, upon the at least one identity seed;

receiving, from the first IHS at a second IHS configured to verify an identity of the first IHS, a public key portion of the cryptographic key pair created by the first IHS;

encrypting, by the second IHS, original data into encrypted data using the public key;

sending, by the second IHS, the encrypted data to the first IHS;

receiving, by the second IHS, decrypted data from the first IHS;

determining, by the second IHS, whether the decrypted data matches the original data;

logging changes to the at least one identity seed as a function of time; and triggering a notification based, at least in part, upon a frequency of logged changes to the at least one identity seed.

19. The method of claim 18, wherein the at least one identity seed is produced based upon exclusively immutable variables associated with the unique physical or electrical aspects, and wherein at least in part in response to the decrypted data matching the original data, the second IHS is configured to verify or attest an identity of the first IHS.

20. The method of claim 18, wherein the at least one identity seed is created based upon mutable and immutable variables associated with the unique physical or electrical aspects, and wherein at least in part in response to the decrypted data not matching the original data, the second IHS is configured to notify a user or Information Technology Decision Maker (ITDM) of a hardware change with respect to the first IHS.

* * * * *